Dec. 31, 1935. F. I. GETTY 2,025,977
CIRCUIT CLOSER FOR STEERING WHEELS
Original Filed Feb. 17, 1932 2 Sheets-Sheet 1
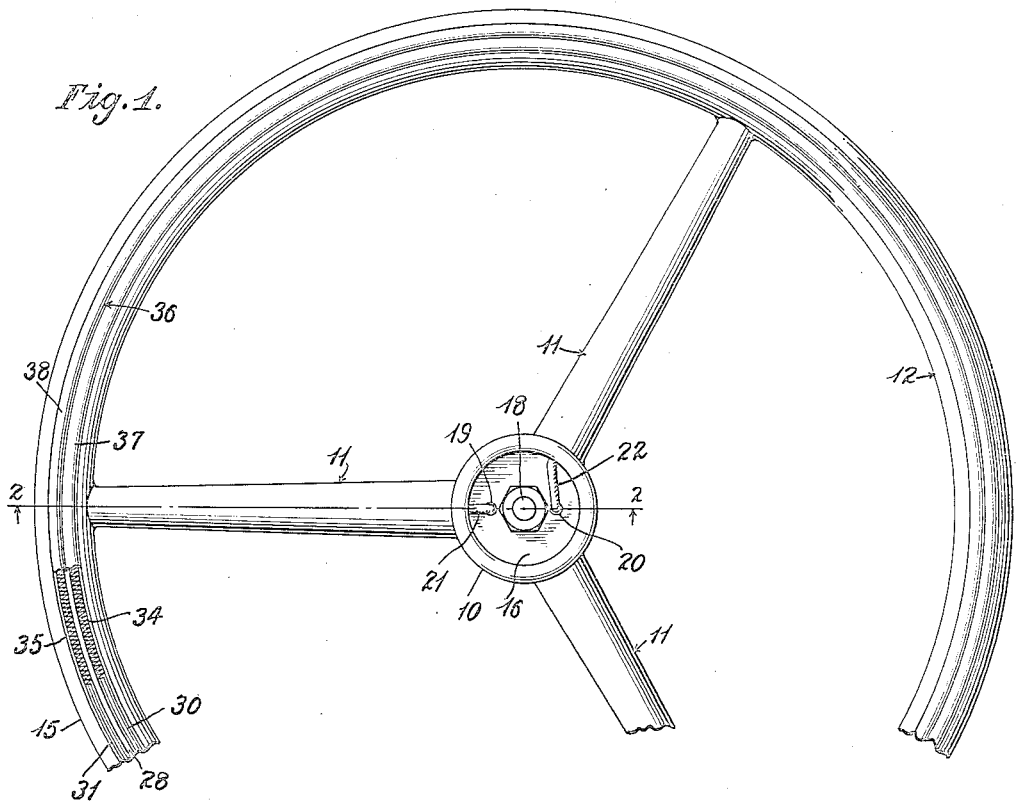
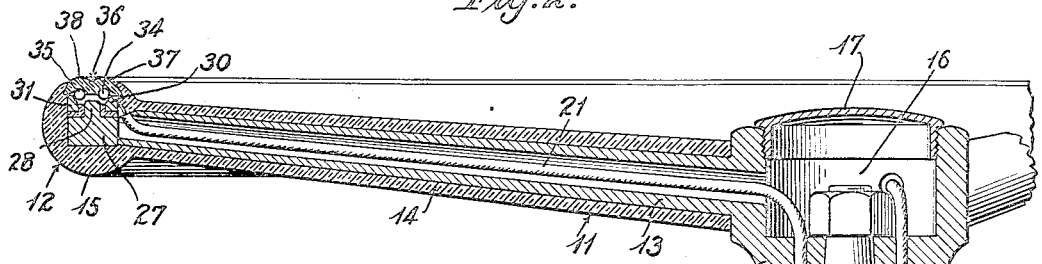
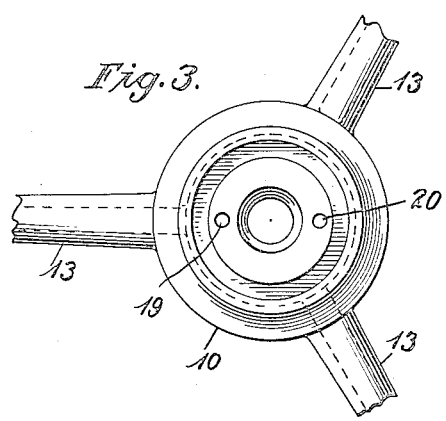
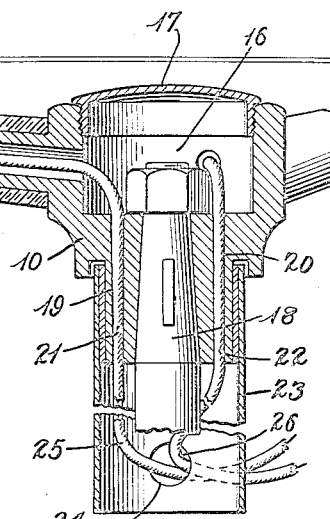
Inventor
Fred I. Getty
By Browne & Phelps
Attorneys Dec. 31, 1935. F. I. GETTY 2,025,977
CIRCUIT CLOSER FOR STEERING WHEELS
Original Filed Feb. 17, 1932 2 Sheets-Sheet 2

Inventor
Fred I. Getty
By Brower & Phelps
Attorneys

Patented Dec. 31, 1935

2,025,977

UNITED STATES PATENT OFFICE 2,025,977

CIRCUIT CLOSER FOR STEERING WHEELS

Fred I. Getty, Jennings, La.

Application February 17, 1932, Serial No. 593,631
Renewed June 24, 1935

20 Claims. (Cl. 200—59)

The invention relates to circuit closers for steering wheels and has as an object the provision of a steering wheel provided with a circuit closer or a plurality thereof for controlling one or more of the electrical accessories of a vehicle.

It is a further object of the invention to provide a circuit closer carried by the rim of a steering wheel of such a character that a circuit may be closed by pressing upon the rim of the wheel at any circumferential point of its perimeter.

It is a further object of the invention to simplify circuit closers of this type.

It is a further object of the invention to provide a circuit closer of the type referred to of such structure that it may be readily duplicated so as to provide a considerable number thereof, all carried by the steering wheel and concealed therein.

Further objects of the invention will appear from the following description when read in connection with the accompanying drawings showing illustrative embodiments of the invention, and wherein:—

Fig. 1 is a plan view partly broken away of a steering wheel carrying circuit closers of the invention;

Fig. 2 is a vertical section on line 2—2 of Fig. 1 upon an enlarged scale;

Fig. 3 is a plan view of the hub of a wheel showing the cover cap removed;

Figure 4:
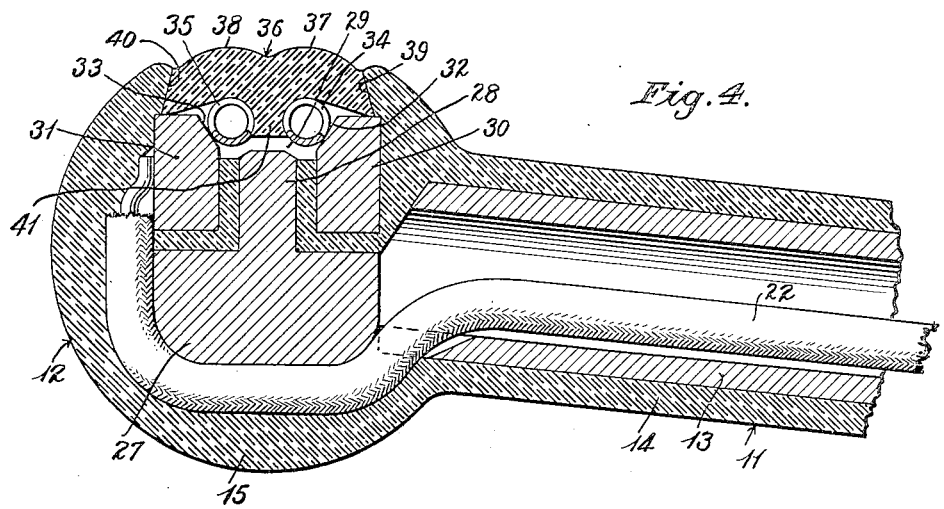
Fig. 4 is a detail section corresponding to a portion of Fig. 2 upon an enlarged scale, and at a different spoke.

As shown in Figs. 1 to 4 inclusive the device comprises a hub 10, spokes 11, and a rim 12. As shown in Figs. 2 and 3 the spokes 11 may be formed with a central tubular metallic portion 13 having a covering 14 of a material as hard rubber which may be, as shown, made integral with sheath 15 for the rim of the steering wheel. In these figures the hub 10 is shown as formed with a recess 16 closed by means of a screw cap 17 and the central portion of the hub exterior of the shaft 18 is formed with perforations 19, 20, through which conductors 21, 22 are shown as passing, which conductors are continued inside of the casing 23 of the steering post for a distance after which they are passed through an opening 24 to connect to electrical accessories of the vehicle upon which the steering wheel is mounted.

The portions 25, 26 of the conductors between the openings 19, 20 and the opening 24 must be sufficiently slack to allow the hub 10 to turn with respect to the casing 23 without placing strain upon the conductors. The conductors 21, 22 are shown as passing from the hub through the tubular spokes to the rim of the wheel to be connected to one side of the conductors which are bridged when the circuit is closed.

The rim of the wheel in Figs. 1-4 inclusive is shown as formed with a metallic core 27 in electrical contact with the metallic portion 13 of the spokes and as formed with an annular flange 28, the upper portion of which is exposed in an annular recess 29 formed in the covering 15 of the rim of the wheel.

As shown the rim of the wheel also comprises annular conducting rings 30, 31 insulated from the flange 28 and the body 27 of the core of the rim, the upper ends of the rings 30, 31 being also exposed in the recess 29. The corners 32, 33 of the rings 30, 31 and also the upper corners of the flange 28 are shown as cut away for the purpose of making a better contact with the bridging member.

To bridge between the flange 28 and the rings 30, 31, there are shown a pair of members 34, 35 desirably in the form of bands of helically wound wire and these bands are desirably substantially continuous throughout the rim of the wheel although they would be fully operative if made of a series of sections with their ends closely approximated, the requirement being that the band is so nearly continuous as to provide bridging means at any point in the circumference of the wheel at which pressure may be applied.

To close the recess 29 there is provided a closure 36 of resilient material desirably formed of partially vulcanized rubber which may yield when pressed upon and the closure is shown as formed with a bead as 37, 38 over each of the bridge members 34, 35 to guide the finger or thumb of the user to a proper position to close the desired circuit.

To retain the closure 36 in the recess, the walls of the recess are shown as undercut at 39, 40 and the edges of the closure 36 are shaped complementary therewith so that after deformation of the closure to force it into the recess, expansion thereof will retain the closure in place. If desired, the closure may be additionally secured therein by any suitable form of cement.

To hold the bridging elements 34, 35 out of bridging relation to the conducting portions of the rim, in the form of the invention shown in Figs. 1 to 4, the closure 36 is formed with a flange portion 41 joining the lower surface of the closure in a concave portion in which the bridging members seat and the bridging members are shown as retained at their seat by contact with the sloping portions 32, 33 of rings 31, 32. When the bead 37 or 38 is pressed upon, the bridging member will ride down the sloping portion 32 or 33 into contact with the flange 28 to close a circuit between one of the wires 21, 22 and the frame of the vehicle.

Figure 5:
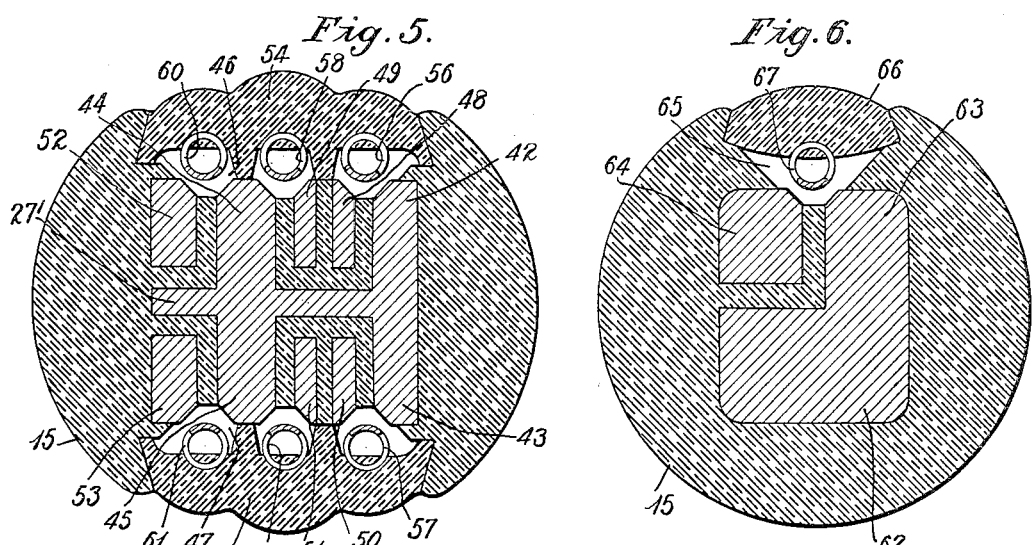
Fig. 5 is a transverse section of a modified form of the invention embodying six circuit closers.

In the form of the invention shown in Fig. 5 the rim 15 is shown as provided with a core 27' formed with four annular flanges 42, 43, 44, 45, exposed in recesses 46, 47 upon the upper and lower surfaces of the rim of the wheel and with six annular rings 48—53, each of said rings being insulated from each other and from the core of the wheel.

The recesses 46, 47 are formed with undercut edges in the same manner as in the form of the invention already described and the closure members 54, 55 are formed with three beads upon each of their outer surfaces to guide the finger to a proper position for pressure to close any of the six circuit closers embodied in this form of the invention.

In this form of the invention also the bridges 56—61 are formed of bands of helical wire but are shown as having a portion of each successive turn thereof embedded in the material of the inner surface of closures 54, 55 so as to be carried thereby and by resilience of the closures to be held out of bridging relation to the adjacent spaced conductors.

It will be understood that in the application of the form of the invention of Fig. 5 to the steering wheel, the core 27' will be grounded upon the frame of the vehicle through the metallic portion of the spokes and that in a three spoked wheel two insulated wires will pass through the interior of each spoke and each be connected in an obvious manner to one of the rings 48—53.

Figure 6:
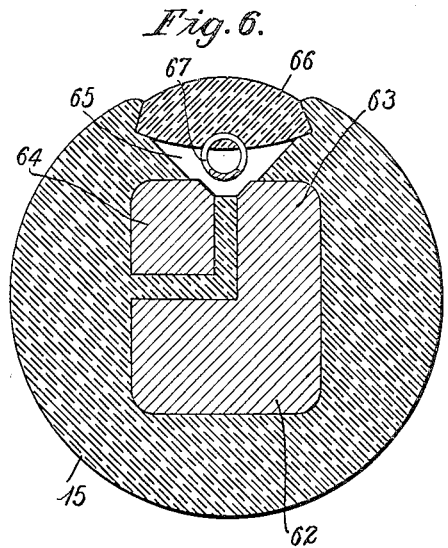
Fig. 6 is a detail transverse section of a rim of a wheel showing a further modified form of the invention embodying a single circuit closer.

In the form of the invention of Fig. 6 the core 62 is formed with a single annular flange 63 and a single ring 64 is imbedded within the wheel, portions of the two members being exposed in a recess 65 provided with a closure 66 of resilient material as already described carrying a bridging member 67 in the manner described in connection with Fig. 5. This form of the invention is desirable where a single accessory, as a horn only, is to be controlled from the rim of the wheel.

Figure 7:
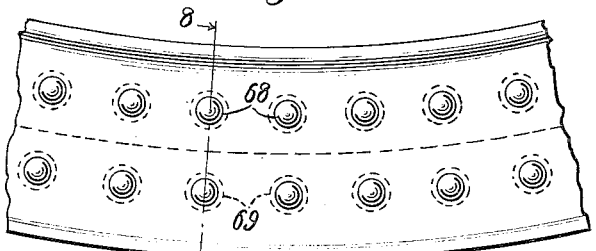
Fig. 7 is a bottom plan view of a recessed closure showing a modified form of bridging elements.
Figure 8:
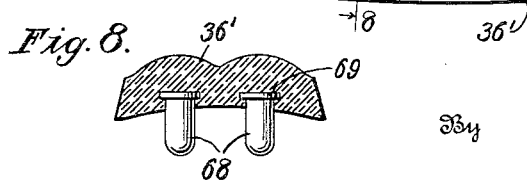
Fig. 8 is a transverse section on line 8—8 of Fig. 7.

Figs. 7 and 8 illustrate modified form of bridging elements comprising a plurality of metallic elements 68 shown as formed with flange 69 at an end, which flanges are embedded in the material of the closure 36' of, for instance, partially vulcanized or soft rubber. When the closure 36' is in place in a form of wheel such as shown in Fig. 4, a circle of the elements 68 will be held in spaced relation to each of the rings 30, 31 and the flange 28 and the elements 68 are placed sufficiently close together that pressure upon any point of the closure 36' and upon the appropriate bead thereof will close one of the circuits in the recess.

The form of the invention of Fig. 5 enables the steering wheel to carry six circuit closers which may be utilized to control a horn, right and left hand direction signals, and three different varieties of illumination of the road lamps by utilizing therewith a suitable form of accessories.

Minor changes may be made in the physical embodiments of the invention within the scope of the appended claims without departing from the spirit thereof.

I claim:

1. A circuit closer for steering wheels comprising, in combination, a wheel rim having an annular recess and comprising a metallic core and a metallic ring concentric with and insulated from said core, said ring and core exposed in said recess, a metallic hub and spokes comprising metallic portions in electric conductive relation between said hub and core, a resilient closure for said recess, a bridging member interlocking with a portion of said closure and thereby normally held out of bridging relation to said ring and core but movable to such relation by pressure upon said closure and a conductor connected to said ring and electrically insulated from the remainder of the wheel structure for connection with a vehicle accessory.

2. A circuit closer for steering wheels comprising, in combination, a wheel rim having an annular recess and comprising a metallic core and a metallic ring concentric with and insulated from said core, said ring and core exposed in said recess, a metallic hub and spokes comprising metallic portions in electric conductive relation between said hub and core, a resilient closure for said recess, a bridging member embedded in the material of said closure and thereby normally held out of bridging relation to said ring and core but movable to such relation by pressure upon said closure and a conductor connected to said ring and electrically insulated from the remainder of the wheel structure for connection with a vehicle accessory.

3. A circuit closer for steering wheels comprising, in combination, a wheel rim having an annular recess, a pair of bared spaced conductors exposed in said recess, a resilient closure for said recess retained therein, said closure formed of partially vulcanized rubber and having a flange projecting into the recess, said flange having a lateral recess providing an overhanging portion, a bridging member entering said lateral recess and retained therein at least partially by said overhanging portion to hold the bridging member normally out of bridging relation to said conductors, the relation of the parts being such that inward pressure upon the closure member may force the bridging member to bridging contact with said conductors.

4. A circuit closer for steering wheels comprising, in combination, a wheel rim having an annular recess, a pair of bared conductors exposed in said recess in insulated spaced relation, a resilient closure for said recess formed of partially vulcanized rubber, a bridging member comprising a substantially continuous band of helical wire interlocking with a portion of said closure member and thereby held in said recess normally out of bridging relation to said conductors and movable to such relation by pressure upon said closure.

5. A circuit closer for steering wheels comprising, in combination, a wheel rim having an annular recess, a pair of bared conductors exposed in said recess in insulated spaced relation, a resilient closure for said recess formed of partially vulcanized rubber, a bridging member comprising a substantially continuous band of helical wire, a portion of the successive coils of said band embedded in the material of said closure member and thereby held in said recess normally out of bridging relation to said conductors and movable to such relation by pressure upon said closure.

6. A circuit closer for steering wheels comprising, in combination: a metallic steering post; a steering wheel rim formed with an annular recess and a metallic core exposed in said recess; spokes having metallic portions conductively connecting said core and post; a closure for said recess formed of resilient insulating material; a conductor insulated from said post, spokes and core for connection to an electrical device to be controlled by the circuit closer; and means for closing a circuit through said conductor, core, spokes and post comprising a substantially continuous band of helically wound wire having a portion of its successive turns interlocking with a portion of the material of said closure and residing in said recess; said helical conductor wire normally held out of contact with said core by resilience of said closure and movable to such contact by pressure on the exterior of the closure.

7. A circuit closer for steering wheels comprising, in combination: a steering wheel rim formed with an annular recess and a core, a portion of said core of metallic material exposed in said recess; means for grounding said core on the steering post; conductors insulated from said core and means; a resilient closure for said recess of partially vulcanized rubber interlocking with the side walls of said recess to be retained therein; said closure formed with an annular rib resting against a portion of said core, dividing said recess into a plurality of annular passages; means in each of said pasages to close a circuit through the respective conductors and the metallic portion of said core comprising conducting means partially embedded in the material of said closure, normally held out of contact with said metallic portion by resilience of said closure and depressible into such contact by pressure on the exterior of the closure.

8. A circuit closer for steering wheels comprising, in combination: a wheel rim having an annular recess; pairs of normally separated circuit closing contact elements, one of each pair being movably located in said recess; a resilient closure covering the said contact elements, and fitted in the recess to be retained therein; annular beads carried by the outer surface of said closure one for each movable element and positioned so that pressure applied to any point on one of said beads will bring the contact elements of a chosen pair together to close an electric circuit.

9. A circuit closer for steering wheels comprising, in combination: a wheel rim having an annular recess; pairs of normally separated circuit closing contact elements in said recess, one of which of each pair is movably located therein; a resilient closure covering the said contact elements and fitted in the recess to be retained therein; a portion of the closure interlocking with each of the movable contact elements so as to hold it in open circuit position; annular beads on the outer surface of the closure one for each pair of elements which are so positioned that pressure applied to any point on a chosen bead will bring the contact elements of the corresponding pair together and close an electric circuit.

10. A circuit closer for steering wheels comprising, in combination: a wheel rim having an annular recess; pairs of normally separated circuit closing contact elements in said recess, one of which of each pair is movably located therein; a resilient closure covering the said contact elements and fitted in the recess to be retained therein; the said movable contact elements being embedded in the material of said closure so as to be held in open circuit position; annular beads on the outer surface of the closure one for each pair of elements, which beads are so positioned that pressure applied to any point on a chosen bead will bring the contact elements of the corresponding pair together and close an electric circuit.

11. A circuit closer for steering wheels comprising, in combination: a wheel rim having an annular recess; normally separated circuit closing contact elements in said recess, one of which is movable and consists of a substantially continuous band of helical wire; a resilient closure covering the said contact elements, which closure is fitted in the recess to be retained therein; an annular bead located on the outer surface of the closure and positioned so that pressure applied to any point on said bead will bring said contact elements together and close an electric circuit.

12. A circuit closer for steering wheels comprising, in combination: a wheel rim having an annular recess; normally separated circuit closing contact elements in said recess, one of which is movable and consists of a substantially continuous band of helical wire; a resilient closure covering the said contact elements and fitting in the recess to be retained therein; a portion of said closure interlocking with the movable contact element to hold the same in open circuit position; an annular bead located on the outer surface of the closure and positioned so that pressure applied to any point on said bead will bring the contact elements together and close an electric circuit.

13. A circuit closer for steering wheels comprising, in combination: a wheel rim having an annular recess; normally separated circuit closing contact elements in said recess, one of which is movable and consists of a substantially continuous band of helical wire; a resilient closure covering the said contact elements and fitted in the recess to be retained therein; the said movable contact element being embedded in the material of said closure so as to be held in open circuit position; with an annular bead on the outer surface of the closure and positioned so that pressure applied to any point on said bead will bring the contact elements together and close an electric circuit.

14. A circuit closer for steering wheels comprising in combination: a wheel rim having an annular recess and comprising a metallic core and a metallic ring concentric with and insulated from said core; said ring and core exposed in said recess; a metallic hub and spokes comprising metallic portions in electric conductive relation between said hub and core; a resilient closure for said recess fitted to the side walls to be retained therein; an annular bead upon the outer surface of the closure; and a bridging member underneath said closure normally held out of bridging relation to said ring and core but movable to said relation by pressure upon the beaded surface of said closure; and a conductor connected to said ring and electrically insulated from the remainder of the wheel structure for connection with a vehicle accessory.

15. A circuit closer for steering wheels comprising, in combination: a wheel rim having an annular recess and comprising a metallic core and a metallic ring concentric with and insulated from said core, said ring and core exposed in said recess; a metallic hub and spokes comprising metallic portions in electric conductive relation between said hub and core; a resilient closure for said recess fitted to the side walls to be retained therein; an annular bead upon the outer surface of the closure; a bridging member interlocking with a portion of said closure and thereby normally held out of bridging relation with said ring and core but movable to such relation by pressure upon the beaded portion of said closure; and a conductor connected to said ring and electrically insulated from the remainder of the wheel structure for connection with the vehicle accessory.

16. A circuit closer for steering wheels comprising, in combination: a wheel rim having an annular recess and comprising a metallic core and a metallic ring concentric with and insulated from said core, said ring and core exposed in said recess; a metallic hub and spokes comprising metallic portions in electric conductive relation between said hub and core; a resilient closure for said recess fitted to the side walls to be retained therein; an annular bead upon the outer surface of the closure; a bridging member below and embedded in the material of said closure and thereby normally held out of bridging relation to said ring and core but movable to such relation by pressure upon the beaded portion of said closure; and a conductor connected to said ring and electrically insulated from the remainder of the wheel structure for connection with a vehicle accessory.

17. A circuit closer for steering wheels comprising, in combination: a wheel rim having an annular recess and a metallic core formed with an annular flange, a portion thereof exposed in said recess; an annular metallic ring seated in and insulated from an angle formed by said flange and the body of said core, a portion of said ring exposed in said recess; a metallic hub and spokes comprising metallic portions in electric conductive relation between said hub and core; a resilient closure for said recess; a bridging member interlocking with a portion of said closure and thereby normally held out of bridging relation to said ring and core but movable to said relation by pressure upon said closure; and a conductor connected to said ring and electrically insulated from the remainder of the wheel structure for connection with a vehicle accessory.

18. A circuit closer for steering wheels comprising, in combination: a wheel rim having an annular recess and a metallic core formed with an annular flange, a portion thereof exposed in said recess; an annular metallic ring seated in and insulated from an angle formed by said flange and the body of said core; a portion of said ring exposed in said recess; a metallic hub and spokes comprising metallic portions in electric conductive relation between said hub and core; a resilient closure for said recess; a bridging member embedded in the material of said closure and thereby normally held out of bridging relation to said ring and core but movable to said relation by pressure upon said closure; and a conductor connected to said ring and electrically insulated from the remainder of the wheel structure, for connection with a vehicle accessory.

19. A circuit closer for steering wheels comprising, in combination: a wheel rim having an annular recess; a pair of bared conductors exposed in said recess in insulated spaced relation; a resilient closure for said recess; a bridging member comprising a substantially continuous band of helical wire interlocking with a portion of said closure member and thereby held in said recess normally out of bridging relation to said conductors and movable to such relation by pressure upon said closure.

20. A circuit closer for steering wheels comprising, in combination: a wheel rim having an annular recess, a pair of bared conductors exposed in said recess in insulated spaced relation; a resilient closure for said recess; a bridging member comprising a substantially continuous band of helical wire, a portion of the successive coils of said band embedded in the material of said closure member and thereby held in said recess normally out of bridging relation to said conductors and movable to such relation by pressure upon said closure.

FRED I. GETTY.